US007199889B2

(12) United States Patent
Miyano

(10) Patent No.: US 7,199,889 B2
(45) Date of Patent: Apr. 3, 2007

(54) PRINTER CAPABLE OF INVALIDATING A DOCUMENT

(75) Inventor: Tsuyoshi Miyano, San Jose, CA (US)

(73) Assignee: Alps Elecric Co., Ltd., Ota-ku, Tokyo (JP)

( * ) Notice: Subject to any disclaimer, the term of this patent is extended or adjusted under 35 U.S.C. 154(b) by 912 days.

(21) Appl. No.: 09/898,875

(22) Filed: Jul. 2, 2001

(65) Prior Publication Data

US 2003/0002067 A1 Jan. 2, 2003

(51) Int. Cl.
*G06K 15/00* (2006.01)

(52) U.S. Cl. .................................... 358/1.14; 358/1.15

(58) Field of Classification Search ................. 358/1.1, 358/1.5, 1.13, 1.14, 1.15, 1.2, 1.18, 1.4; 399/12, 399/24, 80

See application file for complete search history.

(56) References Cited

U.S. PATENT DOCUMENTS 4,965,613 A * 10/1990 Morris et al. ................. 346/25
5,065,347 A * 11/1991 Pajak et al. ................. 715/835
5,420,406 A * 5/1995 Izawa et al. ................ 235/379
5,671,282 A * 9/1997 Wolff et al. ................. 713/179
5,813,009 A * 9/1998 Johnson et al. ............. 707/100
5,982,956 A * 11/1999 Lahmi ........................ 382/306
6,088,119 A * 7/2000 Manchala et al. ......... 358/1.14
6,233,684 B1 * 5/2001 Stefik et al. ................ 713/176
6,324,350 B1 * 11/2001 Ito et al. ....................... 399/12
6,498,655 B1 * 12/2002 Brooks et al. ............. 358/1.12
6,728,000 B1 * 4/2004 Lapstun et al. ............ 358/1.15
6,735,575 B1 * 5/2004 Kara ........................... 705/50
6,771,796 B2 * 8/2004 Rhoads ........................ 382/100
6,807,388 B1 * 10/2004 Kojima et al. ................ 399/80
2003/0061322 A1 * 3/2003 Igarashi et al. ............. 709/223

FOREIGN PATENT DOCUMENTS

JP 10-069553 3/1998

* cited by examiner

*Primary Examiner*—Jerome Grant
(74) *Attorney, Agent, or Firm*—Beyer Weaver LLP.

(57) ABSTRACT

A printer capable of invalidating a document of value is described. The printer includes a printing mechanism, a cutter, a sensor suitable for sensing authentication characteristics of a document and outputting a sensor signal corresponding to the sensed characteristics, and a controller. The controller is operable to send authentication data representing the sensor signal to a server, cause the cutter to cut the document to invalidate the document, and send data representing completion of the invalidation of the document to the server.

15 Claims, 6 Drawing Sheets

PRINTER CAPABLE OF INVALIDATING A DOCUMENT

RELATED APPLICATION DATA

The present application is related to U.S. patent application Ser. No. 09/898,684, for "PRINTER FOR PRINTING IN CONJUNCTION WITH A SERVER" (Miyano) filed concurrently herewith and assigned to the assignee of the present invention, which is incorporated herein by reference for all purposes.

BACKGROUND OF THE INVENTION

The present invention relates to a printer, and more specifically, to apparatus and methods for invalidating a document of value.

Printers, for example, thermal transfer printers, are used for printing various documents with high resolution and full colors (e.g., 8 bits for each of CMYK). The printing quality of the printers has been improved to the extent that documents printed by these printers are used as documents of value, e.g., original tickets, gift certificates, postage stamps, and the like. At the same time, prices for these high-quality printers have been substantially reduced.

In a situation where a user prints out an original valuable document based on printing data retrieved from a remote host (e.g., a content provider's server), the current network/printing systems are not capable of dealing with the user's cancellation request. Once the original document is issued by the printer, the conventional systems have no remedies for cancellation of the issued document. In other words, the user is not able to make refund transactions for cancellation of the issuance of the document.

In view of these and other issues, it would be desirable to have a technique allowing a printer to invalidate the issued document and perform transactions for cancellation with the server.

SUMMARY OF THE INVENTION

According to various embodiments of the present invention, a printer accepts a request for cancellation of an issued (or printed) document of value from a user. The user inserts the document into a slot on the printer. A sensor in the printer scans the document in order to sense authentication characteristics necessary for authentication of the document by a server. The printer generates authentication data representing a sensor signal generated by the sensor, and sends the authentication data to the server. The server receives the authentication data of the document, and performs authentication process using a database for the document. If the document is authenticated by the server, the server allows the printer to invalidating the document by cutting. The printer cuts the document in pieces for invalidation, and sends data indicating successful completion of invalidating the document. Upon receiving the completion data, the server proceeds to refund procedures with another server maintained by a financial institution.

One aspect of the present invention provides a printer capable of invalidating a document of value. The printer includes a printing mechanism, a cutter, a sensor, and a controller. The sensor is operable to sense authentication characteristics of a document, and output sensor signal corresponding to the sensed characteristics. The controller is operable to send authentication data representing the sensor signal to a server, cause the cutter to cut the document to invalidate the document, and send data representing completion of the invalidation of the document to the server.

Another aspect of the present invention provides a method for invalidating a document. According to the method, first a sensor in a printer senses authentication characteristics of the document, and outputs a sensor signal corresponding to the sensed characteristics. A controller of the printer then sends authentication data representing the sensor signal to a server. Finally, the controller causes a cutter to cut the document to invalidate the document, and sends data representing completion of the invalidation of the document to the server.

A further understanding of the nature and advantages of the present invention may be realized by reference to the remaining portions of the specification and the drawings.

DETAILED DESCRIPTION OF SPECIFIC EMBODIMENTS

Various embodiments of the present invention will now be described in detail with reference to the drawings, wherein like elements are referred to with like reference labels throughout.

Figure 1:
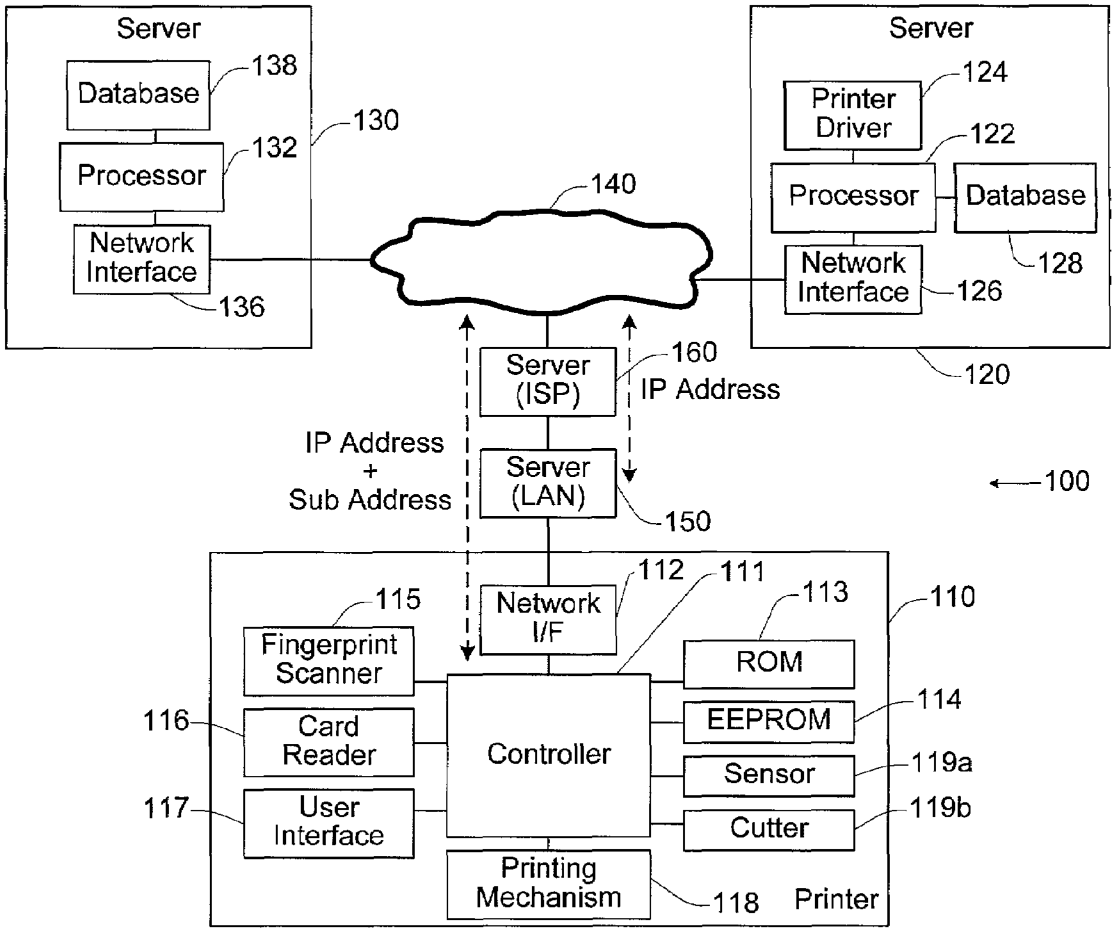
FIG. 1 is a block diagram of a system including a printer coupled to a remote server according to a specific embodiment of the present invention.

FIG. 1 is a block diagram of a system including a printer coupled to a remote server according to a specific embodiment of the present invention. The system 100 includes a printer 110, a content server 120, and a billing server 130, each of which is directly or indirectly connected to a suitable network 140 including any combination of the Internet and/or other various networks as described in detail later. The printer 110 is connected to the network 140 through a LAN server 150 for managing a LAN (Local Area Network) and an ISP server 160 managed by an ISP (Internet Service Provider). The printer 110 communicates with the content server 120 in order to retrieve image data from the content server 120 for issuing a document (e.g., checks, tickets, gift certificates, postage stamps, and the like), which typically has value.

A user using the printer 110 and the LAN server 150 has an access to the content server 120, which is maintained by, for example, a content provider. When the user wants to purchase, for example, a concert ticket from the content provider, and have the printer 110 print out the original concert ticket, the content server 120 sends necessary image data for issuing the ticket by the printer 110 through the network 140, the ISP server 160 and the LAN server 150. The image data output by the content server 120 has been already rendered (or rasterized) by a processor 122 using a printer driver software 124 for the printer 110. The rendered image data is then encoded by the processor 122 using a suitable encoding algorithm, and output through a network interface 126 to the printer 110. For simplicity, in this specification, a printer which is allowed to print documents of value (e.g., negotiable instruments, tickets, various certificates, checks, postage stamps, and the like) is referred to as a "printer for valuable documents."

In other words, the content server 120 includes a printer driver 124 which is capable of rendering image data for a document of value. Intervening servers (not shown) on the network and the local LAN server 150 directly connected to the printer 110 for valuable documents do not render or rasterize the image data. In other words, the rendered image data generated by the content server 120 is not rendered or rasterized while being transmitted to the printer 110 through servers on the network, thereby avoiding any alterations or modifications to the original rendered image data.

The printer 110 includes a controller 111, a network interface 112, a ROM (Read-Only Memory) 113, an EEPROM (Electrically Erasable Programmable Read-Only Memory) 114, a fingerprint scanner 115, a card reader 116, a user interface 117 and a printing mechanism 118. The controller 111 controls various functions of components included in the printer 110, communicates with an external device by exchanging data through the network interface 112, and processes the retrieved data. The controller 111 is typically implemented by a microprocessor unit, and may be associated other control circuitry including one or more microprocessor units and/or one or more associated integrated circuits.

The network interface 112 connects the controller 111 to the LAN server 150 using, for example, the Ethernet protocol. The LAN server 150 communicates with the ISP server 160 using TCP/IP (Transport Control Protocol/Internet Protocol). The ISP server 160 communicates with the content provider content server 120 using TCP/IP. The network connection between the network interface 112 and the servers 150 and 160 includes wired and/or wireless connections. It should be understood that the printer 110 and the content server 120 may be communicated through one or more network devices including PCs (Personal Computers), servers, routers, Internet appliances, terminal adapters, and the like.

In a specific embodiment, the ROM 113 stores various parameters or data associated with the printer 110 and/or controller 111. The identification data associated with the printer 110 includes at least one of (i) data representing the printer 110 for valuable documents (e.g., manufacturer's name and model number of the printer 110) and (ii) information uniquely assigned to the printer 110 (e.g., a serial number of the printer 110). The EEPROM 114 may store at least one of (i) an IP address of the printer 110 and (ii) the information unique to the printer 110 including an identification number issued by an organization which controls use of printers for valuable documents. The EEPROM 114 may further store data representing a decoding table, an encoding table, and an activate code received from the content server 120 as described later. Various embodiments of the present invention may use other types of a suitable storage medium which serves as the EEPROM 114, including a ROM (read only memory), a RAM (random access memory), a hard disk drive, and other magnetic, optical or magneto-optical data storage devices.

The fingerprint scanner 115 includes a transparent platen for flat impressions of fingerprints, against which a fingertip of the user is pressed, and an optical scanning unit for generating user data corresponding to the user's fingerprint. The card reader 116 includes a data input unit which retrieves user data stored in a card inserted by the user. For example, the card is a credit card, and the user data represents credit card information of the user. The data input unit includes at least one of (i) a magnetic head which scans on a magnetic stripe of the card, (ii) a set of contact pads for electrically connecting to corresponding contact pads provided on the card. The data input unit may be modified depending on the recording type of the user's card. Although the specific embodiment of the present invention includes the fingerprint scanner 115 and the card reader 116 which is operable to generate user data unique to the user for authentication by the content server 120, it should be understood that one of these may be omitted for simplicity.

The user interface 117 includes any suitable display for presenting information to the user and/or input device for receiving the user's responses. The suitable display includes, for example, an LED (Light Emitting Diode), an LCD (Liquid Crystal Display) panel, and a touch panel using an LCD. The suitable input device includes, for example, a switch, a potentiometer, and a touch panel using an LCD. The user interface 117 receives information to be output to the user from the controller 111, and sends information input from the user to the controller 111.

The printing mechanism 118 may be any suitable printing mechanism including a thermal transfer printing mechanism, an ink jet printing mechanism, an electrophotographic printing (i.e., "laser printing") mechanism, and the like. Typically, the printing mechanism 118 prints an image for the document of value requested by the user on a print medium, such as paper. Typically, the printing mechanism 118 prints an image for the document of value requested by the user on a print medium including paper, plastic material, thin metal material, and the like. The printing mechanism 118 may utilize a monochrome printing scheme, and other printing methods using special inks including UV (Ultraviolet) inks and/or magnetic inks in addition to the full-color printing scheme.

Figure 6:
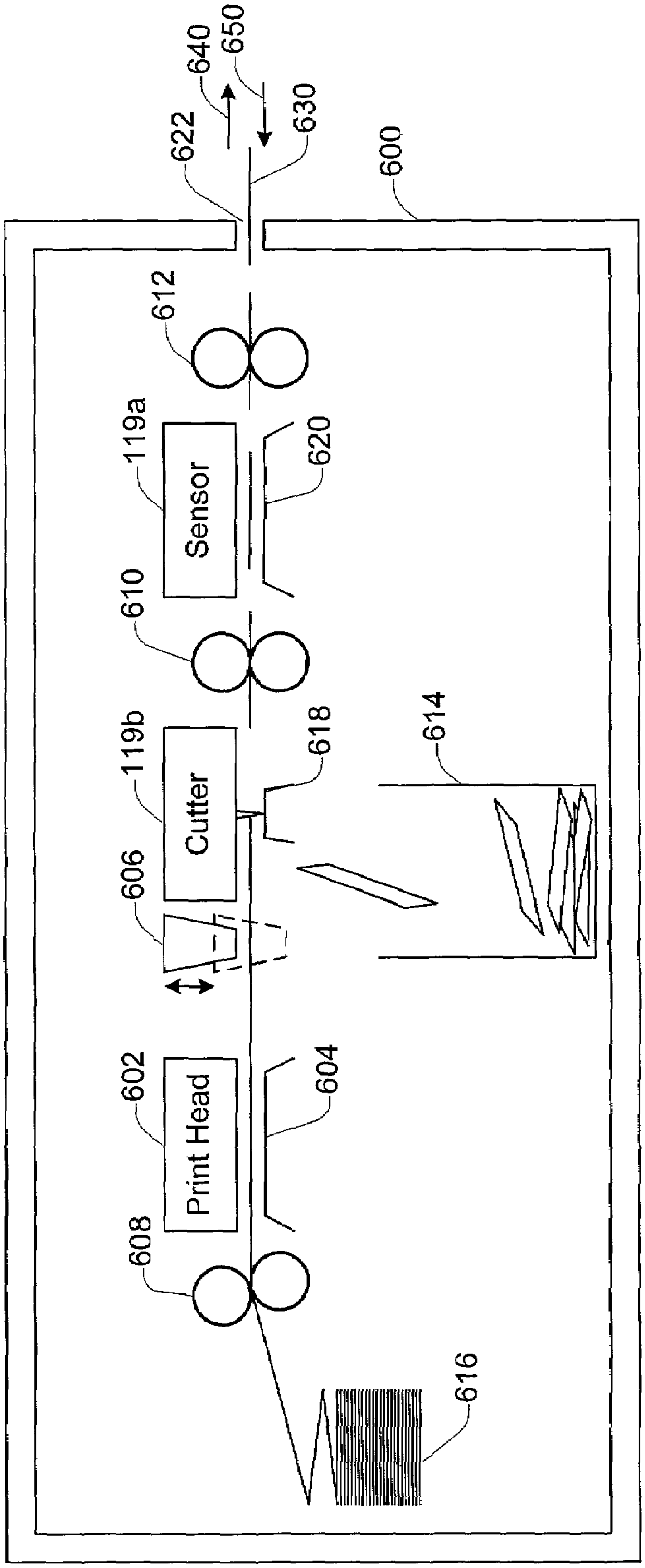
FIG. 6 is a cross sectional view of one specific embodiment of the printer according to the present invention.

A sensor 119*a* senses characteristics of a document inserted in a slot 622 shown in FIG. 6 provided on the printer 110. The sensor 119*a* includes any combination of one or more photo sensors, UV light sensors, and/or magnetic sensors. The sensor 119*a* outputs to the controller 111 a sensor signal which represents characteristics of the document. The characteristics of the document include printed images of the document, watermarks, thickness, transmissivity and reflectance with respect to a specific wavelength of light, magnetic properties, and the like. The controller 111 receives the sensor signal from the 119*a* and converts the sensor signal into sensor data corresponding to the sensor signal, which is suitable for use in authenticating the document by the content server 120. The sensor data for the authentication of the document is referred to as "authentication data" in the specification. When the printer 110 sends the sensor data to the content server 120 in order to have the document which the user wants to cancel authenticated by the content server 120, the controller 111 encodes the sensor data by using encoding data included in the decoding/encoding table 418.

A cutter 119*b* cuts the inserted document in order to invalidate the document. For example, the cutter 119*b* includes a knife-edge which cuts the document, and an actuator to move the knife-edge with respect to the document so that the knife-edge cuts the document.

The LAN server 150 communicates with the printer 110 by, for example, the Ethernet protocol. The LAN server 150 may be connected to other external devices, such as a PC (personal computer), a printer server, a router, and the like. The connection between the printer 110 and the LAN server 150 may be combination of wired and/or wireless coupling using various data transmission medium such as twisted pair cables, baseband coaxial cables, broadband coaxial cables, optical fibers, radio frequency waves, infrared waves, and the like.

The ISP server 160, which is provided by, for example, an ISP, communicates with the LAN server 150 and the network 140 typically by the TCP/IP protocol. The content server 120 provided by a content provider also communicates with the network 140 typically by the TCP/IP protocol.

The network 140 may be any combination of networks including the Internet, a LAN, a MAN (Metropolitan Area Network), a WAN (Wide Area Network), a global area network, and any number of private networks currently referred to as an Intranet. Such a combination of networks may be implemented with any number of hardware and software components, transmission media and network protocols.

When the printer 110, which has been hypothetically authenticated already for purposes of explanation, sends a request for issuing a document to the content server 120, the content server 120 first checks an activate code sent by the printer 110. The processor 122 of the content server 120 looks up into a database 128 which contains a list of activate codes corresponding to users having valid accounts for certain services. For example, when a user requests for issuance of a concert ticket, the user must have a valid account for the ticket issuing services of the content provider maintaining the content server 120. If the content server 120 confirms that the user has a valid activate code by matching the user's activate code with those stored in the database 128, then the processor 122 performs rendering (or rasterizing) of an image to be appeared on the requested document based on unrendered (or unrasterized) image data stored in the database 128. The processor 122 then encodes the rendered image data by using an encoding table, and sends the encoded rendered image data to the printer 110 via the network 140, the ISP server 160, and the LAN server 150. In a specific embodiment, the decoding/encoding table described later used for transmission of various data between the printer 110 and the content server 120 is stored in the database 128 of the content server 120. However, the decoding/encoding table may be stored in a component other than the database 128 within the content server 120, or in an external component outside the content server 120.

When the transaction of issuing the document (here, the concert ticket) finishes normally, the content server 120 communicates with the billing server 130 provided by, for example, a credit card company for billing purposes. The billing server 130 also communicates with the content server 120 via the network 140. The billing server 130 includes a processor 132, a network interface 136, and a database 138. The processor 132 receives information about the user's billing from the content server 120, and performs a billing process using the database 138.

Figure 2:
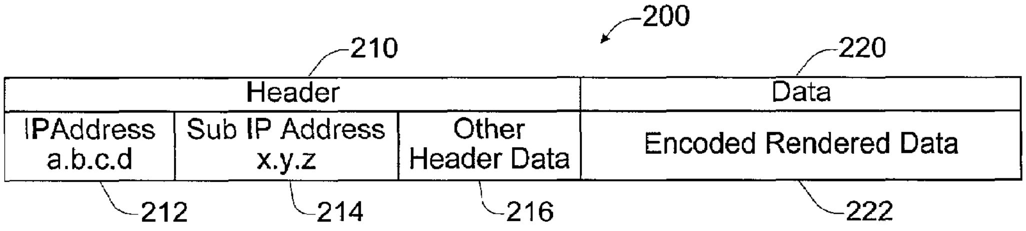
FIG. 2 is a diagram of a data packet used for a specific embodiment of the present invention.

FIG. 2 is a diagram of a data packet used for a specific embodiment of the present invention. According to the specific embodiment of the present invention, a data packet 200 of the encoded rendered image data sent from the content server 120 to the printer 110 includes a header portion 210 and a data portion 220. The header portion 210 includes an IP address 212, a sub IP address 214, and other header data 216. The data portion 220 includes encoded rendered image data 222, which is all or part of the encoded rendered image data generated by the processor 122 using the printer driver 124. In this embodiment, the IP address 212 (namely, four octets of "a.b.c.d") specifies the LAN server 150, and combination of the IP address 212 (a.b.c.d) and the sub IP address 214 (namely, three octets of "x.y.z") specifies the printer 110.

When the LAN server 150 receives a data packet containing the IP address 212 (a.b.c.d) corresponding to the LAN server 150, the LAN server 150 looks into the header portion 210 to check whether the header portion 210 includes the sub IP address (x.y.z) corresponding to the printer 110. If the header 210 has the sub IP address (x.y.z), then the LAN server 150 passes the data packet 200 to the printer 110 without parsing the data packet 200 further. The LAN server 150 assigns a unique sub IP address corresponding to the printer 110 in order to specify a destination printer for an incoming data packet.

Figure 3:
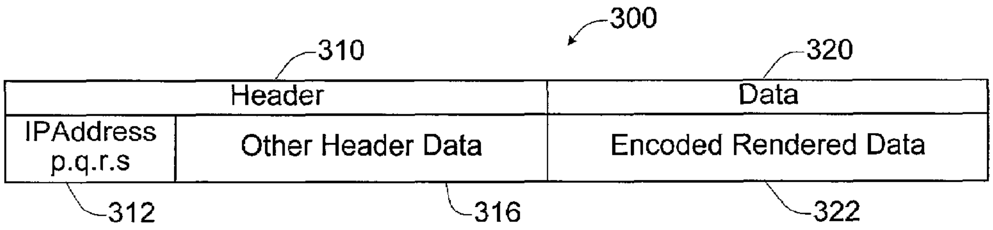
FIG. 3 is a diagram of a data packet used for another specific embodiment of the present invention.

FIG. 3 is a diagram of a data packet used for another specific embodiment of the present invention. According to this specific embodiment of the present invention, a data packet 300 of the encoded rendered image data sent from the content server 120 to the printer 110 includes a header portion 310 and a data portion 320. The header portion 310 includes an IP address 312 and other header data 316. The data portion 320 includes encoded rendered image data 322, which is all or part of the encoded rendered image data generated by the processor 122 using the printer driver 124. In this embodiment, the IP address 312 (namely, four octets of"p.q.r.s") specifies the printer 110.

When the LAN server 150 receives a data packet containing the IP address 312 (p.q.r.s) corresponding to the printer 110, the LAN server 150 passes the data packet 300 to the printer 110 without parsing the data packet 300. A system administrator can assign a unique IP address corresponding to the printer 110 in order to specify a destination printer for an incoming data packet.

Figure 4:
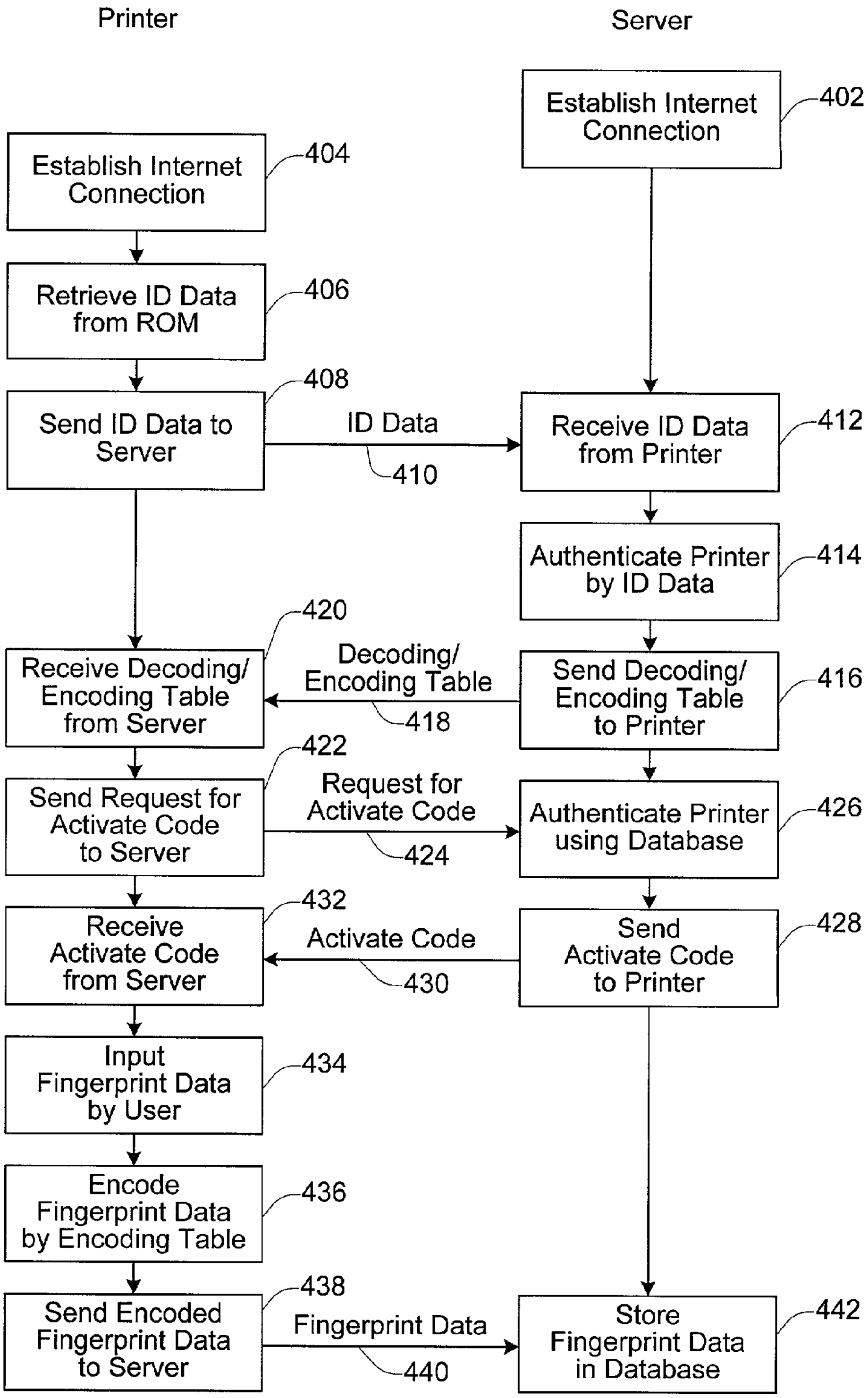
FIG. 4 is a flowchart of a specific embodiment of method for communicating between a server and a server according to the present invention.

FIG. 4 is a flowchart of a communicating method for a printer for use with a specific embodiment of a method according to the present invention. In FIG. 4, right-hand operations and left-hand operations relate to those of the content server 120 and the printer 110, respectively. A vertical arrow and a horizontal arrow in FIG. 4 represent transition from one operation to another operation, and a data transaction between the printer 110 and the content server 120, respectively.

At 402, the content server 120 establishes a connection with the network 140. The connection may be established through an Intranet connection. At 404, the printer 110 establishes a connection with the network 140 via, for example, the servers 150 and 160. At 406, the controller 111 of the printer 110 retrieves its uniquely assigned identification data 410 associated with the printer 110 from the ROM 113. At 408, the printer 110 sends the retrieved identification data 410 to the content server 120 for authentication of the printer 110 via the network interface 112, the servers 150 and 160, and the network 140.

At 412, the processor 122 of the content server 120 receives the identification data 410 sent from the printer 110 through the network interface 126. At 414, the processor 122 matches the identification data 410 with data stored in the database 128 in order to determine whether the printer 110 is a printer for valuable documents, i.e., is authorized to print documents of value. The content server 120 may utilize an external database connected thereto for this authentication process for the printer 110. If the determination at 414 indicates that the printer 110 is an authorized one, then at 416, the content server 120 sends to the printer 110 a decoding/encoding table 418 for future secured communication between the content server 120 and the printer 110. The decoding/encoding table 418 may be a single combined data table or two separate data tables, one of which is for decoding data and another of which is for encoding data. The decoding/encoding table 418 may include, for example, coefficients for polynomials used for decoding and encoding the rendered image data. At 420, the printer 110 receives the decoding/encoding table 418 from the content server 120. The controller 111 stores the decoding/encoding table 418 into the EEPROM 114.

According to the present invention, the decoding/encoding table 418, which is generally referred to as the "decoding/encoding data," may take various suitable data formats depending on the algorithm used for decoding/encoding. Such a decoding/encoding table may include, for example, one or more tables containing data for decoding/encoding, or data representing algorithm (for example, polynomials or coefficients for the polynomials).

At 422, the printer 110 sends a request for an activate code 424 to the content server 120. The request for an activate code 424 is sent to the content server 120 when the user contacts the content server 120 in order to receive services (e.g., purchase and print a document of value by the printer 110). The content provider maintaining the content server 120 may provide various issuing services for documents of value (tickets or other valuable documents). In such a case, the activate code is typically service-specific. In other words, the activate code is given to the printer 110 based on the services which the user wishes to receive. Thus, the user may need two different activate codes in order to purchase and print, for example, a concert ticket and an airplane ticket since the issuance of these two tickets is regarded as different services, and thus is separately managed by the content provider using two different service accounts held by the user.

At 426, the processor 122 determines whether the user's account for the specific services which the user requests to receive is valid based on user account data stored in the database 128. The user account data includes, for example, a user's name, a user identification code, an expiration data for the account, and the like. Also at 426, billing information for the user may be sent to the billing server 130 via the network 140. The processor 132 of the billing server 130 retrieves the billing information through the network interface 136, and performs necessary billing transactions with the database 138 for the services to be rendered to the user.

The content server 120 may utilize an external database connected thereto for this authentication process for the user. If the determination at 426 indicates that the user is authorized to receive the requested services for issuing a document of value, then at 428, the content server 120 sends to the printer 110 the activate code 430 for a future service request. At 432, the printer 110 receives the activate code 430 from the content server 120. The controller 111 stores the activate code 430 in the EEPROM 114.

At 434, the printer 110 prompts the user to input fingerprint data to be sent to the content server 120. Specifically, the printer 110 requests the user to put the user's fingertip on a scanning plane of the fingerprint scanner 115. Then, the controller 111 temporarily stores the fingerprint data in a RAM (described as a primary storage 604 later referring to FIG. 6) for data processing such as data compression, encoding, and the like. At 436, the controller 111 encodes the fingerprint data by using the encoding table for secure communication with the content server 120.

At 438, the controller 111 sends the encoded fingerprint data 440 to the content server 120 via the network interface 112, the servers 150 and 160, the network 140, and the network interface 126. At 442, the content server 120 receives the encoded fingerprint data 440 and stores the fingerprint data into the database 128 in order to check the user's identity when a request for issuance of a document of value is made in the future.

Operations at 404–420 may be done only when the printer 110 is installed at a user's place for the first time, and may be omitted after the authentication 414 of the printer 110 by the content server 120. Operations at 422–442 may be done only when the user makes a request for the services for the first time, and may be omitted after the authentication 426 of the user by the content server 120. As described above, the operations 402–442 enables the content server 120 to authenticate the printer 110, authenticate the user's account who needs to receive a specific services, and register the user's fingerprint for security purposes.

Figure 5:
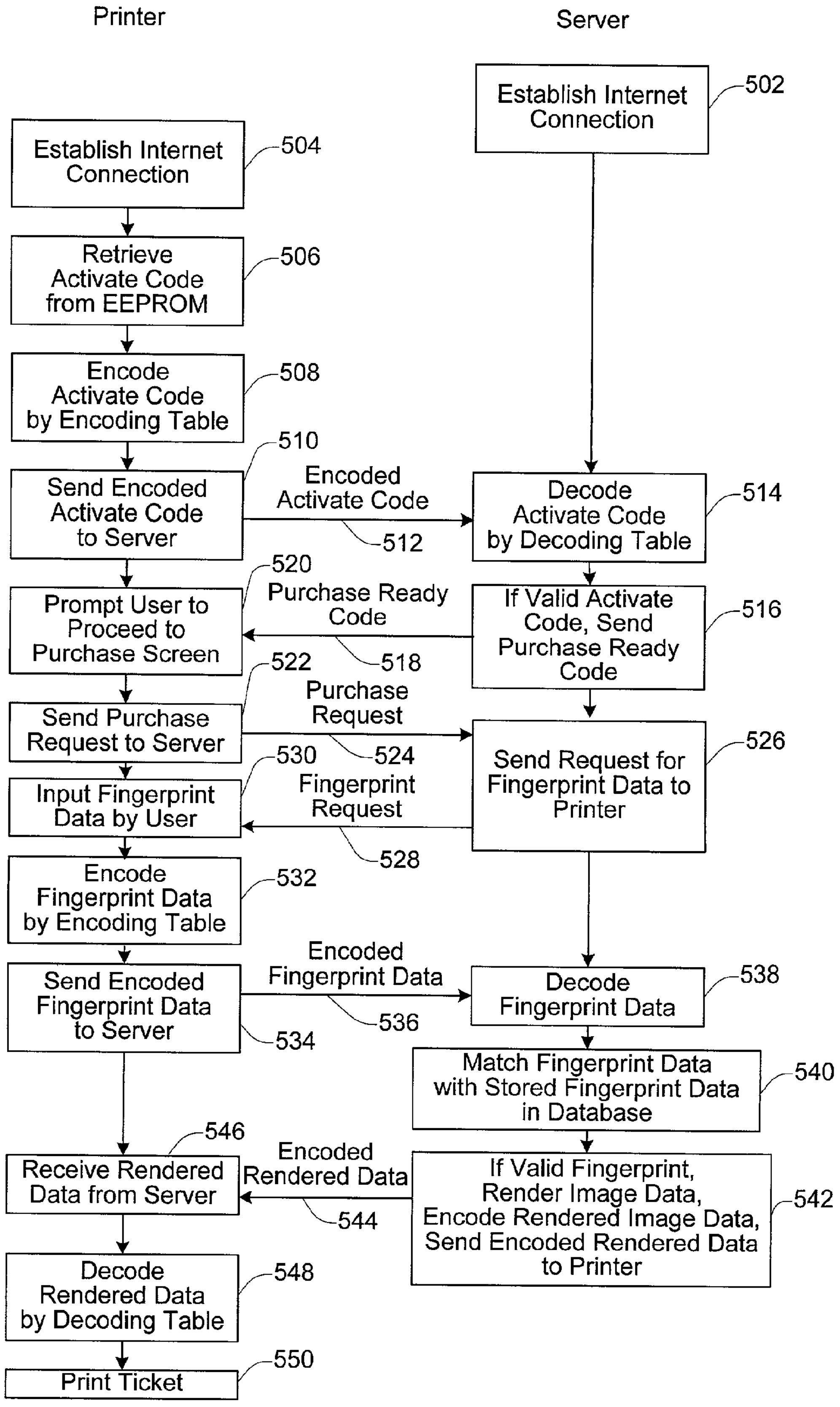
FIG. 5 is a flowchart of another specific embodiment of method for communicating between a server and a printer according to the present invention.

FIG. 5 is a flowchart of a communicating method for a printer for use with a specific embodiment of a method according to the present invention. In FIG. 5, right-hand operations and left-hand operations relate to those of the content server 120 and the printer 110, respectively. A vertical arrow and a horizontal arrow in FIG. 5 represent transition from one operation to another operation, and a data transaction between the printer 110 and the content server 120, respectively.

At 502, the content server 120 establishes a connection with the network 140. The connection may be established through an Intranet connection. At 504, the printer 110 establishes a connection with the network 140 via, for example, the servers 150 and 160. At 506, the controller 111 of the printer 110 retrieves the activate code 430 already assigned to the user of the printer 110 from the EEPROM 114. At 508, the processor 122 encodes the activate code 430 by using encoding data included in the decoding/encoding table 418 also stored in the EEPROM 114. This encoding of the activate code 430 prevents intercepting and unauthorized copying of the activate code during transmission of the activate code 430 over the network 140. At 510, the printer 110 sends the encoded activate code 512 to the content server 120 for issuing a document of value via the network interface 112, the servers 150 and 160, and the network 140.

At 514, the processor 122 of the content server 120 receives the encoded activate code 512 sent from the printer 110 through the network interface 126, and decodes the activate code 512 by using the decoding table stored in the database 128. At 516, the processor 122 matches the decoded activate code with data stored in the database 128 in order to determine whether the user of the printer 110 has a valid account for the requested services of issuance of the document. The content server 120 may utilize an external database connected thereto for this authentication process for the user of the printer 110. If the determination at 516 indicates that the user of the printer 110 is authorized one, then the content server 120 sends to the printer 110 a purchase ready code 518 via the network 140. At 520, the printer 110 receives the purchase ready code 518 from the content server 120, and prompts the user to proceed to a purchase screen on the printer 110.

At 522, in response to the user's request to purchase and print a document of value input from the user interface 117 provided on the printer 110, the printer 110 sends a request for purchase 524 to the content server 120. At 526, the processor 122 sends a request for the user's fingerprint data 528 to the printer 110. At 530, the printer 110 receives the request for the user's fingerprint data 528, and prompts the user to input fingerprint data to be sent to the content server 120. Specifically, the printer 110 requests the user to put the user's fingertip on a scanning plane of the fingerprint scanner 115. Then, the controller 111 temporarily stores the fingerprint data in the RAM for data processing such as data compression, encoding, and the like. At 532, the controller 111 encodes the fingerprint data by using the encoding table for secure communication with the content server 120.

At 534, the controller 111 sends the encoded fingerprint data 536 to the content server 120 via the network interface 112, the servers 150 and 160, the network 140, and the network interface 126. At 538, the content server 120 receives the encoded fingerprint data 536 and decodes the encoded fingerprint data 536 by using the decoding table stored in the database 128. At 540, the processor 122 matches the decoded fingerprint data with user data stored into the database 128 in order to check the user's identity and determine whether the user's account for the specific services which the user requests to receive is valid based on user account data stored in the database 128. The content server 120 may utilize an external database connected thereto for this authentication process for the user.

If the determination at 540 indicates that the user is authorized to receive the requested services for issuing a document of value, then at 542, the processor 122 renders (or rasterizes) an image for the requested document of value by utilizing the printer driver 124, encodes the rendered image data by using the encoding table stored in the database 128, and sends the encoded rendered image data 544 to the printer 110 via the network 140. This encoding of the rendered image data prevents intercepting and unauthorized copying for forgery of the rendered image data during transmission over the network 140.

Before rendering the image, the processor 122 of the content server 120 typically "parses" image data for the request document of value stored in the database 128 (i.e., identifies its image type and its location on a printed page and performs any required rotation or scaling) and stores the parsed image data in a RAM (described as a primary storage 604 later referring to FIG. 6) for rendering image. The rendering operation at 542 may include, for example, not only superimposing different objects located at the same physical location, but also conversion of the three primary color planes into corresponding planes for each thermal transfer ink (typically four, or even more for certain printing processes) and other image manipulation appropriate for a particular selection of inks and print medium. Thus, the rendered data generated by the content server 120 includes bit-mapped image data, and does not include code data described by a PDL (page description language), such as ESC/P, LIPS, N201, PostScript, and the like.

At 546, the printer 110 receives the encoded rendered image data 544 from the content server 120. At 548, the controller 111 of the printer 110 decodes the encoded rendered image data 544 by using decoding data included in the decoding/encoding table 418. At 550, the controller 111 prints the requested document of value (e.g., a concert ticket) by the printing mechanism 118 based on the decoded rendered image data. Then, the user obtains the requested document of value as an original using the user's printer 110 by paying online using the servers 120 and 130.

It is understood that in the content server 120, the decoding/encoding table used by the processor 122 may be stored in various devices other than the database 128. For example, the decoding/encoding table may be stored in a mass storage (referred to as 608 in FIG. 6) associated with the processor 122. In the printer 110, the decoding/encoding table may be stored in the EEPROM 114.

Figure 7:
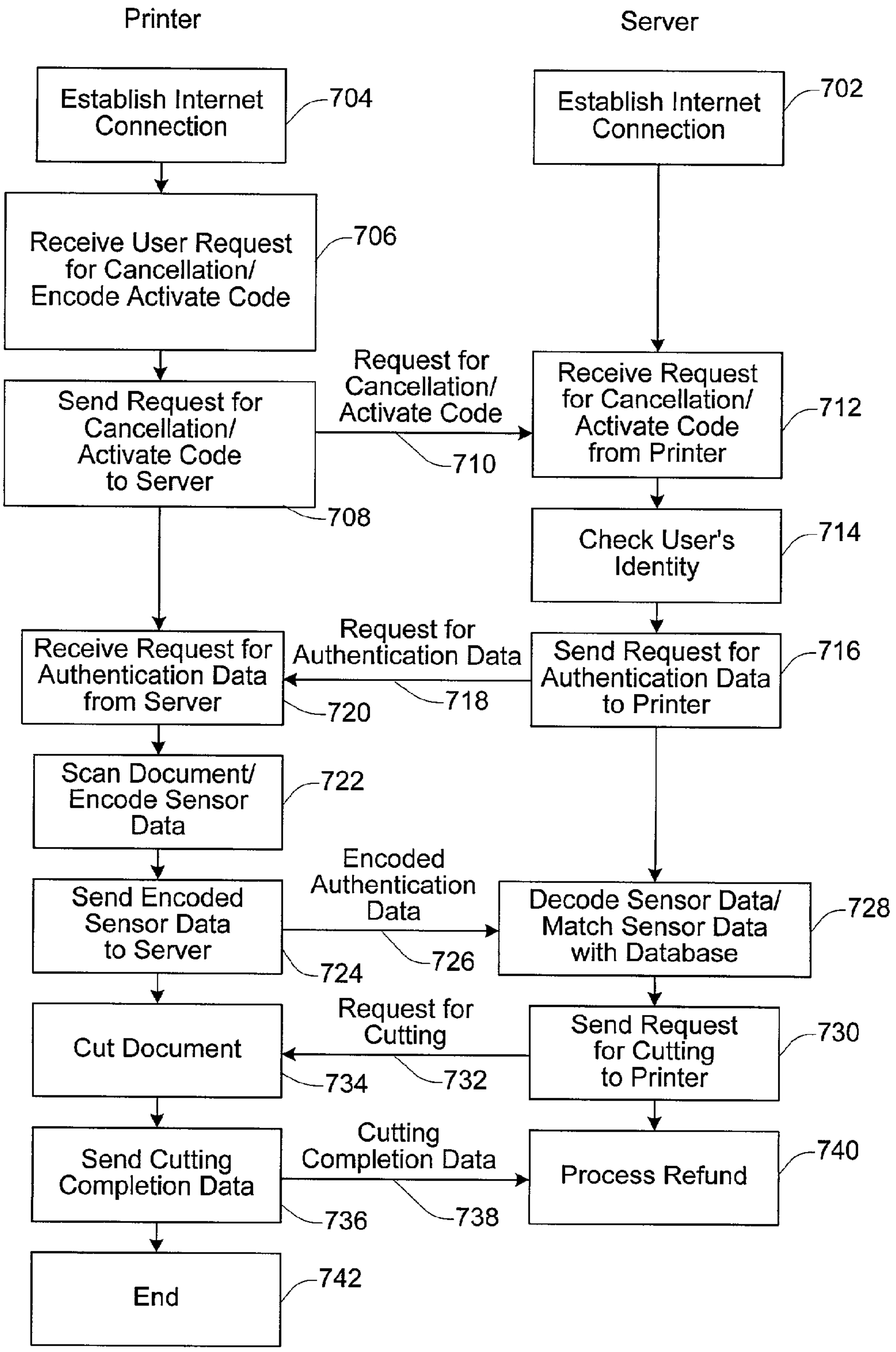
FIG. 7 is a flowchart of a specific embodiment of a method for invalidating a printed document of value according to the present invention.

FIG. 6 is a cross sectional view of one specific embodiment of the printer 110 according to the present invention viewed from the direction perpendicular to a plane in which a sheet of paper is feed in the printer 110. The printer 110 for use with a method described referring to FIG. 7 is capable of invalidating a document of value which was printed by a method described above in connection with FIGS. 1–5 by cutting the document, and performing necessary cancellation transactions with the servers 120 and 130 for refund purposes.

The printer 110 shown in FIG. 1 has a housing 600 which encloses a print head 602, a platen 604, the sensor 119*a*, the cutter 119*b*, a paper path controller 606, paper feeders 608, 610 and 612, a cut paper container 614, paper 616, and paper guides 618 and 620. The housing 600 also has a slot 622. A printed document is ejected from the slot 622 in the direction of an arrow 640. A document to be invalidated 630 is inserted into the slot 622 in the direction of an arrow 650. The paper path controller 606 is actuated by, for example, a solenoid coil so that an inserted document along the arrow 650 falls into the cut paper container 614 after being cut by the cutter 119*b*.

When the printer 110 prints a document of value, the paper feeders 608, 610 and 612 advances the paper 616 so that the paper is printed by the print head 602 on the platen 604, cut by the cutter 119*b* on the paper guide 618, and transported outside of the printer 110 through the slot 622. During the printing operation, the paper path controller 606 allows the paper 616 to pass through the cutter 119*b* and the paper guide 618.

When the printer 110 receives a printed document 630 inserted from the slot 622, the paper feeders 610 and 612 advances the printed document 630 in the direction of the arrow 650 so that the printed document 630 is scanned by the sensor 119*a* on the paper guide 620, cut by the cutter 119*b* on the paper guide 618, and kept in the cut paper container 614. The sensor 119*a* outputs the sensor signal representing characteristics of the document.

FIG. 7 is a flowchart of a specific embodiment of a method for invalidating a printed document of value according to the present invention. In FIG. 7, right-hand operations and left-hand operations relate to those of the content server 120 and the printer 110, respectively. A vertical arrow and a horizontal arrow in FIG. 7 represent transition from one operation to another operation, and a data transaction between the printer 110 and the content server 120, respectively.

At 702, the content server 120 establishes a connection with the network 140. The connection may be established through an Intranet connection. At 704, the printer 110 establishes a connection with the network 140 via, for example, the servers 150 and 160.

At 706, the user interface 117 receives a user's request for cancellation of an issued document of value which was printed by the printer 110 using a method described in U.S. patent application Ser. No. 09/898,684, for "PRINTER FOR PRINTING IN CONJUNCTION WITH A SERVER" (Miyano) filed concurrently herewith and assigned to the assignee of the present invention, which is incorporated herein by reference for all purposes. Also at 706, the printer 110 encodes the activate code 430 for authentication by the content server 120 by using encoding data included in the decoding/encoding table 418.

At 708, the printer 110 sends the request for cancellation and the encoded activate code 710 to the sever 120 via the network 140. The request for cancellation includes, for example, a serial number and a time stamp of the issued document which the user requests to cancel.

At 712, the content server 120 receives the request for cancellation and the encoded activate code 710 sent from the printer 110. At 714, the content server 120 checks identity of the user and validity of the request for cancellation from the user based on the request for cancellation and the encoded activated code 710. Specifically, the content server 120 matches information included in the request for cancellation and the activate code 710 with data stored in the database 128 to check whether the request for cancellation is valid based on the user's purchase history, the user's account for purchase, and the like.

If the content server 120 determines that the request for cancellation is valid, then at 716, the server sends a request 718 for authentication data 726 to the printer 110. At 720, the request 718 for authentication data causes the printer 110 to send to the content server 120 the sensor data representing the sensor signal output from the sensor 119*a*. The request 718 for authentication data, at 720, also causes the controller 111 to scan the document to be invalidated, thereby obtaining the authentication data of the document by scanning the document.

At 722, the printer 110 prompts the user to insert the document into the slot 622 by using the user interface 117. The paper feeders 710 and 712 in the printer 110 forwards the document to the sensor 119*a* in the direction of the arrow 650 so that the sensor 119*a* senses characteristics of the document 730 which the user wants to cancel and obtain a refund for. The sensor 119*a* outputs the sensor signal to the controller 111. Then, controller 111 generates the sensor data based on the sensor signal as the authentication data, and encodes the generated authentication data by using encoding data included in the decoding/encoding table 418.

At 724, the printer 110 sends the encoded authentication data 726 to the content server 120 via the network 140. At 728, the content server 120 decodes the sensor data 726 by using decoding data included in the decoding/encoding table 418 stored in the database 128. Also, the content server 120 matches the decoded sensor data with data stored in the database 128 in order to authenticate the inserted document for cancellation.

If the document is authenticated to be a valid document for cancellation at 728, then at 730, the content server 120 sends a request for cutting 732 to the printer 110. At 734, the controller 111 of the printer 110 causes the cutter 119*b* to cut the document of value for invalidation. The cutter 119*b* cuts the document into slices small enough to protect the user and the content provider against potential forgery or fraud.

At 736, the controller 111 of the printer 110 sends a message containing data 738 indicating completion of cutting the document to the content server 120 via the network 140. At 740, the content server 120 receives the cutting completion data 738 included in the message from the printer 110, and performs necessary billing transactions with the billing server 130 maintained by a financial institution via the network 140 for refund purposes. At 742, the printer 110 returns to a stand-by mode for printing a next document.

The functionality of the embodiments of the present invention can be implemented by any combination of software and/or hardware. For example, the embodiments can be implemented in an operating system (e.g., Windows NT) kernel, in a separate user process, in a library package bound into network applications, on a specially constructed machine, or on a network interface card. In one specific embodiment of the invention, the operations performed by the embodiments of the invention are partially implemented in server software. It is also partially implemented in client code on a device which is connected with the server via the network. Both components may be implemented in an operating system or in an application running on an operating system.

Embodiments of the present invention relate to an apparatus and a method for invalidating a document as described in detail above. This apparatus may be specially constructed (or designed) for the required purposes, or it may be a general-purpose computer selectively activated or configured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method operations. The required architecture or structure for a variety of these machines will appear from the description given below.

Such a programmable machine may be a network device designed to handle network traffic, such as, for example, a network sever. Such network devices may have multiple network interfaces including frame relays or ISDN interfaces, for example. In an alternative embodiment, the item substitution technique of this invention may be implemented on a general-purpose network host machine such as a personal computer or workstation. Further, any or all of the functionality of the invention may be at least partially implemented on a card (e.g., an interface card) for a network device or a general-purpose computing device.

In addition, embodiments of the present invention further relate to computer readable media that include program instructions for performing various computer-implemented operations. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as mini disks, floptical disks; and hardware devices that are specially configured to store and perform program instructions, such as ROM (read-only memory) and RAM (random access memory). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 8:
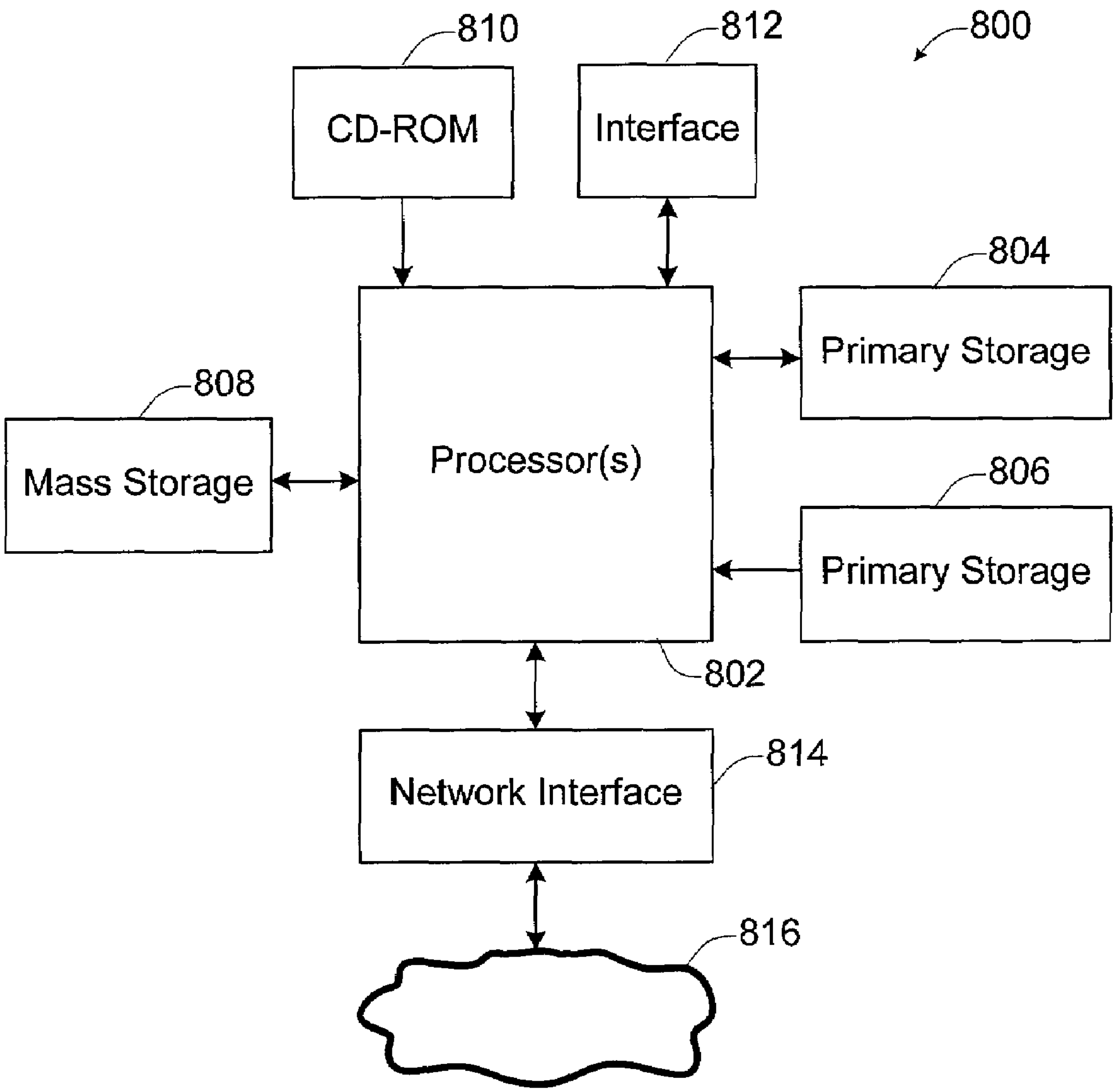
FIG. 8 is a block diagram of a computer system for use with an embodiment of the present invention.

FIG. 8 is a block diagram of a typical computer system in accordance with an embodiment of the present invention. The computer system 800 includes any number of processors 802 (also referred to as controllers, CPUs, or central processing units) that are coupled to storage devices including primary storage 804 (typically a RAM), primary storage 806 (typically a ROM). As is well known in the art, the primary storage 804 acts to transfer data and instructions bi-directionally to the CPU and primary storage 806 is used typically to transfer data and instructions in a uni-directional manner. Both of these primary storage devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 804 as virtual memory. A specific mass storage device such as a CD-ROM 810 may also pass data uni-directionally to the CPU 802.

CPU 802 is also coupled to an interface 812 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network 816 including the Internet and/or an Intranet (typically a LAN, or local area network) using a network interface as shown generally at 814. With such a network interface, it is contemplated that the CPU 802 might receive information from the network 816, or might output information to the network in the course of performing the above-described method operations. The above-described devices and materials will be familiar to those of skill in the computer hardware and software arts.

The network interface 814 is typically provided as an interface card (sometimes referred to as a "line card"). Generally, it controls the sending and receiving of data packets over the network and sometimes support other peripherals used with the computer system 800. The network interface 814 may be one of Ethernet interfaces, frame relay interfaces, cable interfaces, DSL (Digital Subscriber Line) interfaces, token ring interfaces, and the like. In addition, various very high-speed interfaces may be provided such as fast Ethernet interfaces, Gigabit Ethernet interfaces, ATM (Asynchronous Transfer Mode) interfaces, HSSIs (High-Speed Serial Interfaces), FDDIs (Fiber Distributed Data Interface) and the like. Generally, these interfaces may include ports appropriate for communication with the appropriate media. In some cases, they may also include an independent system including a processor and system memory.

The CPU 802 may take various forms. It may include one or more general purpose microprocessors that are selectively configured or reconfigured to implement the functions described herein. Or it may include one or more specially designed processors or microcontrollers that contain logic and/or circuitry for implementing the functions described herein. Any of the logical devices serving as CPU 802 may be designed as general purpose microprocessors, microcontrollers (sometimes simply referred to as "controllers"), ASICs (application specific integrated circuits), DSPs (digital signal processors), PLDs (programmable logic devices), FPGAs (field programmable gate arrays), and the like. They may execute instructions under the control of the hardware, firmware, software, reconfigurable hardware, combinations of these, etc.

The hardware elements described above may be configured (usually temporarily) to act as one or more software modules for performing the operations of this invention. For example, separate modules may be created from program instructions for performing the functionality of the embodiments according to the present invention as described above. The components shown in FIG. 8 are coupled separately, but any or all of them may be coupled through a common system bus (e.g., a PCI bus).

Although the foregoing invention has been described in some detail for purposes of clarity of understanding, it will be apparent that certain changes and modifications may be practiced within the scope of the appended claims.

What is claimed is:

1. A printer comprising:

a printing mechanism for printing images;

a cutter;

a sensor suitable for sensing authentication characteristics of a document and outputting a sensor signal corresponding to the sensed characteristics;

a controller operable to send authentication data representing the sensor signal to a server, cause the cutter to cut the document to invalidate the document, and send data representing completion of the invalidation of the document to the server; and a network interface for coupling the printer to a network, wherein the controller is operable to send the authentication data to the server via the network, and send the data representing completion to the server via the network.

2. The printer of claim 1, wherein the controller is further operable to receive an encoding data from the server via the network, encode the authentication data by using the encoding data, and send the encoded authentication data to the server via the network.

3. The printer of claim 2, wherein the controller is further operable to in response to receiving a request for cancellation of the document from a user, send data representing the request for cancellation of the document to the server via the network, receive a request for the authentication data from the server via the network, cause the sensor to scan the document to obtain the authentication data in response to the request for the authentication data, receive a request to cut the document from the server via the network, and cut the document in response to the request to cut.

4. The printer of claim 3, wherein the printing mechanism includes a thermal transfer mechanism.

5. The printer of claim 1, further comprising:

an opening provided on the printer into which a user inserts the document; and a transport mechanism for transporting the document from the opening to the cutter.

6. The printer of claim 5, wherein the printer retains the document cut by the cutter within a housing of the printer.

7. The printer of claim 1, wherein the sensor is selected from a group comprising a photo sensor, an ultraviolet light sensor, and a magnetic sensor.

8. A printer comprising:

means for printing images;

means for cutting;

means for sensing authentication characteristics of a document and outputting a sensor signal corresponding to the sensed characteristics; means for sending authentication data representing the sensor signal to a server, causing the cutter to cut the document to invalidate the document, and sending data representing completion of the invalidation of the document to the server;

means for coupling the printer to a network;

means for sending the authentication data to the server via the network; and means for sending the data representing completion to the server via the network.

9. A method for invalidating a document, comprising:

sensing authentication characteristics of the document;

outputting a sensor signal corresponding to the sensed characteristics;

sending authentication data representing the sensor signal to a server;

causing a cutter to cut the document to invalidate the document;

sending data representing completion of the invalidation of the document to the server;

sending the authentication data to the server via a network; and sending the data representing completion to the server via the network.

10. The method of claim 9, further comprising:

receiving an encoding data from the server via the network, encoding the authentication data by using the encoding data, and sending the encoded authentication data to the server via the network.

11. The method of claim 10, further comprising:

in response to receiving a request for cancellation of the document from a user, sending data representing the request for cancellation of the document to the server via the network, receiving a request for the authentication data from the server via the network, causing the sensor to scan the document to obtain the authentication data in response to the request for the authentication data, receiving a request to cut the document from the server via the network, and cutting the document in response to the request to cut.

12. The method of claim 9, further comprising transporting the document from an opening to the cutter, the opening being provided on a printer into which a user inserts the document.

13. The method of claim 12, further comprising retaining the document cut by a cutter within a housing of the printer.

14. The method of claim 12, wherein the sensing is performed by at least one of a photo sensor, an ultraviolet light sensor, and a magnetic sensor.

15. A computer program product for invalidating a document comprising:

a computer readable medium; and computer readable code stored in the computer readable medium for causing a computer to:

sense authentication characteristics of the document;

output a sensor signal corresponding to the sensed characteristics;

send authentication data representing the sensor signal to a server;

cause a cutter to cut the document to invalidate the document;

send data representing completion of the invalidation of the document to the server;

a network interface for coupling the printer to a network, send the authentication data to the server via a network coupled to the printer by a network interface, and send the data representing completion to the server via the network.

* * * * *